US012050998B2

(12) United States Patent
Serebryakov et al.

(10) Patent No.: US 12,050,998 B2
(45) Date of Patent: Jul. 30, 2024

(54) SYSTEMS AND METHODS FOR INTELLIGENT DATA SHUFFLING FOR HIGH-PERFORMANCE DISTRIBUTED MACHINE LEARNING TRAINING

(71) Applicant: HEWLETT PACKARD ENTERPRISE DEVELOPMENT LP, Houston, TX (US)

(72) Inventors: Sergey Serebryakov, Saint-Petersburg (RU); Cong Xu, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 690 days.

(21) Appl. No.: 17/010,744

(22) Filed: Sep. 2, 2020

(65) Prior Publication Data

US 2022/0067577 A1 Mar. 3, 2022

(51) Int. Cl.
G06N 3/084 (2023.01)
G06F 11/34 (2006.01)
G06F 18/214 (2023.01)
G06F 18/241 (2023.01)
G06N 3/045 (2023.01)
G06N 3/08 (2023.01)

(52) U.S. Cl.
CPC ......... *G06N 3/084* (2013.01); *G06F 11/3433* (2013.01); *G06F 18/214* (2023.01); *G06F 18/241* (2023.01); *G06N 3/045* (2023.01); *G06N 3/08* (2013.01)

(58) Field of Classification Search
CPC .................................................... G06N 3/084
See application file for complete search history.

(56) References Cited

U.S. PATENT DOCUMENTS

| 2017/0300829 A1 | 10/2017 | Iyengar et al. |
| 2019/0370692 A1 | 12/2019 | Cho et al. |
| 2020/0110994 A1 | 4/2020 | Goto et al. |

OTHER PUBLICATIONS

S. Wang et al., "When Edge Meets Learning: Adaptive Control for Resource-Constrained Distributed Machine Learning," IEEE INFOCOM 2018—IEEE Conference on Computer Communications, Honolulu, HI, USA, 2018, pp. 63-71, doi: 10.1109/INFOCOM.2018.8486403. (Year: 2018).*

(Continued)

*Primary Examiner* — Kakali Chaki
*Assistant Examiner* — Johnathan R Germick
(74) *Attorney, Agent, or Firm* — Sheppard Mullin Richter & Hampton LLP

(57) ABSTRACT

Systems and methods are provided for data shuffling for distributed machine learning training, including each training node in the network receiving a shard of training data, wherein the training data set is divided into shards having data items. Each data item is assigned to a working set such that each of the working set includes data items from multiple shards. The training nodes perform training using the data items of a first working set that are in each node's shard. Upon completion of the training using the data items of the first working set, the training nodes performing training using the data items of a second working set that are in their shards; and while the training nodes are performing training on their respective subsets of shards of the second working set, the nodes randomly shuffling data items in the first working set to create a shuffled first working set.

24 Claims, 9 Drawing Sheets

(56) References Cited

OTHER PUBLICATIONS

Y. Zhu et al., "Entropy-Aware I/O Pipelining for Large-Scale Deep Learning on HPC Systems," 2018 IEEE 26th International Symposium on Modeling, Analysis, and Simulation of Computer and Telecommunication Systems (MASCOTS), Milwaukee, WI, USA, 2018, pp. 145-156, doi: 10.1109/MASCOTS.2018.00023. (Year: 2018).*
Zhi-Lin Ke, Hsiang-Yun Cheng, & Chia-Lin Yang (2018). LIRS: Enabling efficient machine learning on NVM-based storage via a lightweight implementation of random shuffling. CoRR, abs/1810.04509. (Year: 2018).*
Recht, B., & Ré, C. (2011). Parallel Stochastic Gradient Algorithms for Large-Scale Matrix Completion. Mathematical Programming Computation, 5. (Year: 2011).*
Choi, D. et al., Faster Neural Network Training with Data Echoing, (Research Paper), May 8, 2020, 15 Pgs.
Kaufmann, M., Improving the Efficiency of Heterogeneous Clouds, (Research Paper), Dissertation thesis for degree of a Doctor of Engineering from the KIT Faculty of Computer Science of the Karlsruhe Institute of Technology (KIT), Oct. 17, 2019, 295 Pgs.
Williams-King, D et al., Shuffler: Fast and Deployable Continuous Code Re-Randomization, (Research Paper), OSDI'16: Proceedings of the 12th USENIX conference on Operating Systems Design and Implementation, Nov. 2016, pp. 367-382.
Fox et al., "Learning Everywhere: Pervasive Machine Learning for Effective High-Performance Computation," 2019 IEEE International Parallel and Distributed Processing Symposium Workshops (IPDPSW), Rio de Janeiro, Brazil, 2019, pp. 422-429.
Meng et al., "Convergence Analysis of Distributed Stochastic Gradient Descent with Shuffling", NeuroComputing, Sep. 29, 2017, pp. 1-18.
MLPerf, "MLPerf Training v0.6 Results", available online at <https://mlperf.org/training-results-0-6/>, Jul. 10, 2019, 3 pages.
OpenAI, "AI and Compute", available online at <https://openai.com/blog/ai-and-compute/>, May 16, 2018, 8 pages.

* cited by examiner

SYSTEMS AND METHODS FOR INTELLIGENT DATA SHUFFLING FOR HIGH-PERFORMANCE DISTRIBUTED MACHINE LEARNING TRAINING

DESCRIPTION OF THE RELATED ART

Mini-batch Stochastic Gradient Descent (SGD) is one of the more widely used optimization algorithms for training neural networks. Given a training dataset D, SGD randomly selects M training examples and uses them to compute vectors of gradients that point in the direction where the neural network loss function increases. Making small steps in the opposite direction results in smaller values of a loss function (which is typically a training objective—minimizing loss function). A typical training process involves repeating the steps of selecting M training examples, computing gradients, updating neural network parameters by and making a small step in the direction opposite to the vector of gradients a large number of times.

Ideally, M training examples are drawn randomly from the training dataset D to achieve better convergence and have theoretical convergence estimates. The term "better convergence" means training a neural network to a desired level of accuracy faster.

Shuffling of the training data may facilitate using SGD to solve machine learning problems. In practice, a simple global shuffling method has proven to work well. According to this simple global shuffling method, the training dataset is globally re-shuffled from time to time, usually, every training epoch (an epoch can be one pass over training dataset). After the global reshuffling, the dataset is scanned sequentially to select M training examples. This is practical for small to medium data sets that fit into the local storage of a single node and when only this single compute node is used for training a model. However, such global shuffling may not be practical for large data sets given computer network constraints (such as limited bandwidth) that may hinder shuffling large quantities of data across multiple nodes in the network.

Accordingly, in many conventional solutions the training data is shuffled globally once before training and then split into a number of disjoint shards. The data set is generally split into one shard for each available compute node. The shards are then copied to their respective nodes and stored in local storage (it is assumed a shard can fit into local storage of its respective node). Accordingly, each node uses only the data from its locally cached shard to train its local model replica, and once all training examples have been processed, each node re-shuffles its data locally and continues training. However, such schema could hurt training performance because data is shuffled locally, not globally, which results in worse convergence compared to a canonical implementation where data is re-shuffled globally.

Scaling is critical to get the training done in a reasonable amount of time due to the exponentially growing amount of compute required to train a model. For instance, latest MLPerf v0.6 training results show that a single system with 8 GPUs trains ResNet50 neural network in 115 minutes, while 130 such systems (1040 GPUs) can train the very same model in 1.69 minutes. According to various studies, the amount of compute used in the largest AI training doubles every 3.4 months, which is much faster than Moore's Law. The reasons are two-fold: (1) increasing complexity of models; and (2) exploding dataset sizes. The number of parameters in a state-of-the-art model has grown in some instances to greater than 10 billion.

Also, a larger model trained on more and more data could yield much better results in accuracy. While benchmarking datasets (e.g., ~250 GB) can fit in DRAM of a single node, real-world applications will require traversing much larger quantities of data. For example, hundreds of millions of images are uploaded to Instagram per day. PetaBytes of sensor and camera input data are collected per week by autonomous driving vehicles. With the convergence of deep learning and high-performance computing (HPC), simulation-generated synthetic data are used for training and the data size growth could be unbounded.

Machine learning (ML) can refer to a method of data analysis in which the building of an analytical model is automated. ML is commonly considered to be a branch of artificial intelligence (AI), where systems are configured and allowed to learn from gathered data. Such systems can identify patterns and/or make decisions with little to no human intervention.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof.

Figure 1:
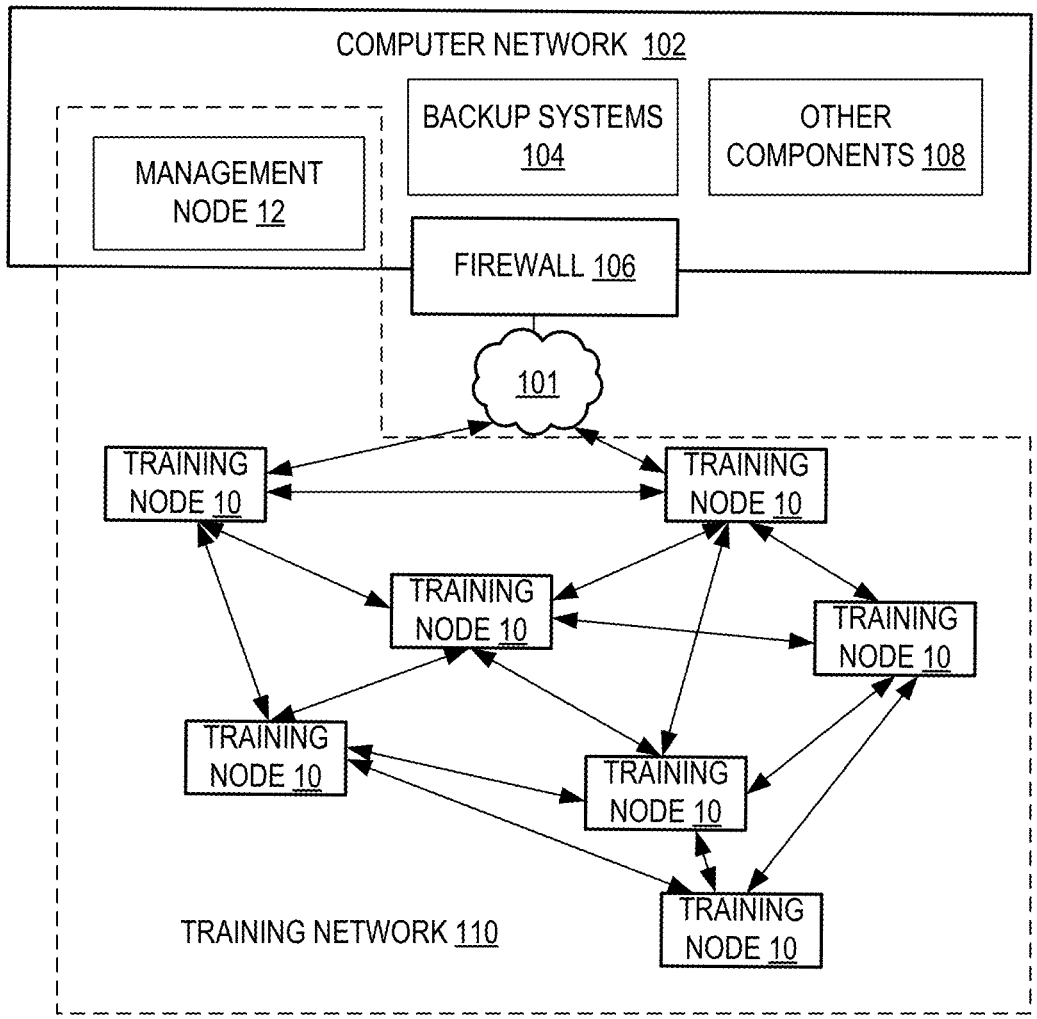
FIG. 1 illustrates an example of a system of distributed machine learning training in accordance with various embodiments of the disclosed technology.

The figures are not intended to be exhaustive or to limit embodiments to the precise form disclosed. It should be understood that the invention can be practiced with modification and alteration, and that the disclosed technology be limited only by the claims and the equivalents thereof.

DETAILED DESCRIPTION

In various implementations, neural network training may be done in iterations. Given an input batch X of training examples, SGD computes neural network outputs Y, compares these outputs with expected outputs Y expected, and performs backpropagation aggregating gradients across nodes. To improve performance, embodiments may perform backpropagation and gradient aggregation simultaneously (e.g., in parallel). Overlapping these two activities may allow the system to effectively hide the communication overhead.

Embodiments may be implemented where the data set is divided into N shards for distribution to N respective nodes. Data files in the shards may each be assigned to a working set, and different data files within a given shard may be assigned to different working sets. The working set may span multiple nodes such that each working set is assigned shards from more than one node. Accordingly, each node may have access to shards from multiple working sets. For example, assume that the data files within the shards are each assigned to either of two working sets: working set A and working set B. Following this example, in operation the nodes begin a training epoch using, for example, SGD. This first training epoch can constitute training using data files from working set A, for example. Data files may refer to units of data, whether or not in traditional file format. Data files may include, for example, actual files such as image files or text files, or they may include other sets or groupings of data.

When this training epoch is complete, the nodes switch to the other working set (in this example, working set B), which can be accomplished, for example, by using a different file path in the local file system. The nodes may also send a message to local processes (which may be referred to as shufflers) indicating that the nodes change their working set from A to B. The shufflers, running in the background, randomly shuffle the data in working set A while the nodes perform training on the data in working set B. This can be performed, for example, until defined shuffling criteria are met or until the nodes have finished the training epoch for working set B. When the nodes finish the training epoch for working set B, they change back to training using working set A and the shufflers begin shuffle working set B in the background. In this manner, data shuffling takes place in the background while the nodes are performing training.

Because the working sets encompass data files across multiple nodes, shuffling within a working set can be performed on data across nodes. Accordingly, the system is not limited to local shuffling. Neither is global shuffling performed as the shuffling is not performed across all working sets. This can improve performance, reducing time to convergence.

Implementations may be configured to throttle the background shuffling process so that it does not negatively impact the training. This can be done by establishing benchmark performance criteria (e.g., measured or modeled), monitoring actual training performance (e.g., number of data instances per second that the system can train) and adjusting the speed at which data is shuffled based on actual training performance as compared to the benchmark performance criteria. The system can allocate more bandwidth to shuffling if measured performance meets expectations or deallocate or dial back allocation if actual performance is suffering. The system can disable throttling when enabling data shuffling during a forward propagation phase of training. Disabling throttling may allow shuffling of data without changing the rate or speed at which data is shuffled during training.

Embodiments of the technology disclosed may further be configured to build on distributed ML, which can be leveraged for its ability to train a common model across multiple nodes (global model) using data (or a subset(s) of data) at each node of the network, as well as validate local models across multiple nodes.

FIG. 1 illustrates an example of a system 100 for intelligent shuffling of training data sets, according to various embodiments. System 100 may include a training network 110. The training network 110 may include a plurality of nodes that are connected to one another using one or more connection protocols, including a peer-to-peer connection protocol. The nodes of the training network 110 may include a management node 12 and a plurality of training nodes 10. The particular number of, configuration of, and connections between the training nodes 10 may vary. As such, the arrangement of the training nodes 10 shown in FIG. 1 is for illustrative purposes only. In alternative embodiments, management node 12 may be implemented as a separate node as illustrated in FIG. 1, or as one or more training nodes 10. Accordingly, management functions performed by management node 12 may be performed by a training node 10 or distributed among some or all of training nodes 10.

In the illustrated example, management node 12 is part of and operates within a firewall 106 of computer network 102 and training nodes 10 operate outside the firewall 106. In one embodiment, management node 102 may be outside of the firewall 106 as well. Training nodes 10 may be used for training and for data shuffling. Accordingly, training nodes 10 may be implemented to, for example, perform SGD training. The computer network 102 may also include one or more backup systems 104 that provides failover protection for the management node 12 and/or other components 108 operating within the computer network. The components of the computer network 102 may communicate with one another via a local area network ("LAN"). The components of the computer network 102 may communicate with devices outside the computer network 102 through the firewall 106. The firewall 106 may be configured as a software firewall and/or a hardware firewall device. The firewall 106 may include or connect with a network switch device that routes network traffic into and out of the computer network via the firewall. The network 101 may include a wide area network ("WAN") that connects devices outside the firewall 106.

Examples of further details of a management node 12 are now described with reference to FIG. 2. The management node 12 in this example may include a processor 20, which may include one or more processors (also interchangeably referred to herein as processors 20, processor(s) 20, or processor 20 for convenience), and a storage device 40, which may include one or more storage devices. The processor 20 may be programmed by one or more computer program instructions, which may be stored in storage device 40. For example, the processor 20 may be programmed to execute instructions to perform functions such as, for example, divide a training data set into shards, define working sets, distribute shards to various training nodes 10, and so on. As used herein, for convenience, the various instructions will be described as performing an operation, when, in fact, the various instructions program the processors 20 (and therefore management node 12) to perform the operation.

Management node 12 in this example also includes a management user interface (UI) 22. The management user interface 22 may provide an interface, such as a graphical user interface, a command line interface, and/or other type of interface configured to receive management option inputs. For instance, a user such as a system administrator may use the management user interface 22 to input operations to be conducted on one or more of the training nodes 10 of the training network 110, or to input a training node to be added. In this manner, the user may manage training nodes 10.

Management node 12 in this example also includes a communication interface 24. Communication interface 24 may be used, for example, to communicate with training nodes 10 or other system elements. In one embodiment, in connection with training operations, communication interface 24 may distribute shards, instructions, or other data or information to training nodes 10.

Storage device 40 may store the training data set 46, which may be broken into shards. Storage device 40 may also store program instructions 48 that may be executed by processor 22 to enable management node 12 to perform its assigned functions. Other data and information may be stored in storage device 40.

Figure 2:
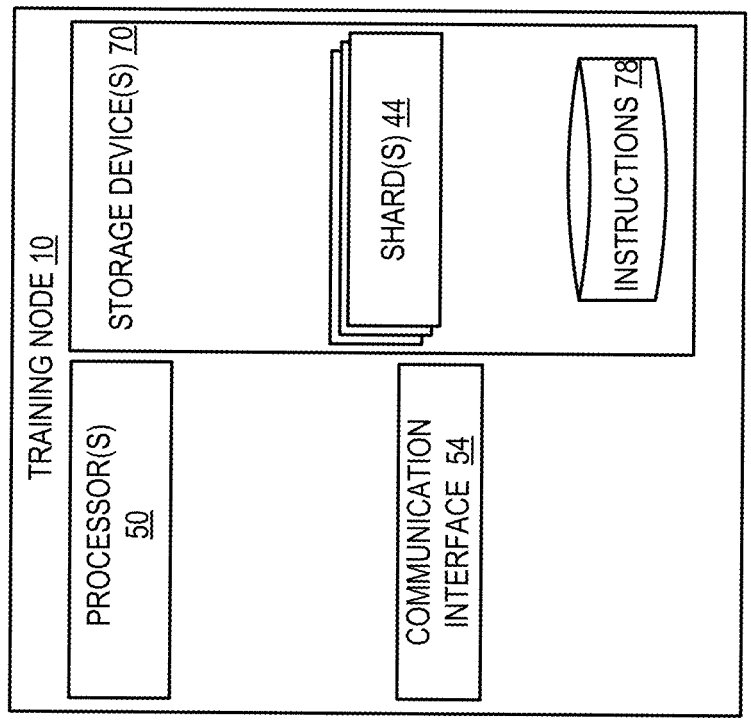
FIG. 2 illustrates an example of a management node and a training node in accordance with various embodiments of the disclosed technology.
Figure 2:
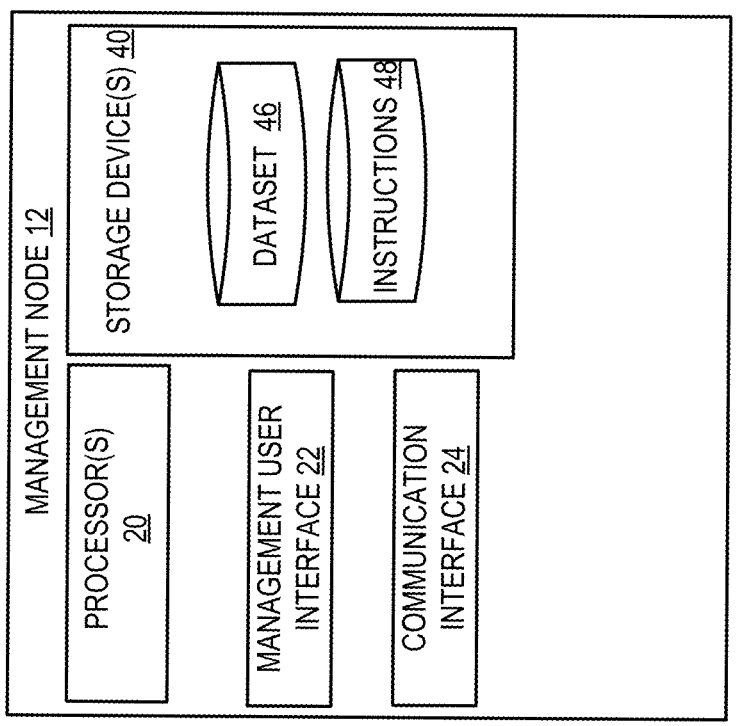

Examples of further details of an example training node 10 are now described with continued reference to FIG. 2. Training nodes 10 may communicate with one another in a peer-to-peer manner. Training nodes 10 may each include a processor 50, which may be implemented as one or more processors (also interchangeably referred to herein as processors 50, processor(s) 50, or processor 50 for convenience), a storage device 70, which may be implemented as one or more storage devices, and/or other components. Although not illustrated, training nodes 10 may also include a user interface.

Processor 50 may be programmed by one or more computer program instructions. For example, processor 50 may be programmed to execute instructions (e.g., instruction 78) to perform various operations, including, for example, training and shuffling. As used herein, for convenience, the various instructions 78 will be described as performing an operation, when, in fact, the various instructions program processor 50 (and therefore training node 10) to perform the operation. Accordingly, shufflers may be implemented, for example, as instructions 78 running on processor 50. Similarly, neural network training (e.g., using stochastic gradient descent (SGD) algorithms) may also be implemented, for example, as instructions 78 running on processor 50. These various functions may be performed using shared processing and data storage capabilities, or they may have their own processing or data storage (or both) capabilities.

Training node 10 in this example also includes a communication interface 54. Communication interface 54 may be used, for example, to communicate with management node 12 and other training nodes 10 or other system elements. In one embodiment, in connection with training operations, communication interface 54 may be used to receive shards, share shards for shuffling, receive instructions, or otherwise communicate other data or information.

Although illustrated in FIG. 2 as a single component, management node 12 and training node 10 each may include a plurality of individual components (such as computer devices) each programmed with at least some of the functions described herein. Processors 20 or 50 may each include one or more physical processors that are programmed by computer program instructions (e.g., single or multiple core Central Processing Units (CPUs) FPGAs (field programmable gateway arrays), GPGPUs (general purpose graphical processing units) or other processors or processing circuits. Furthermore, it should be appreciated that although the various functions are illustrated in FIG. 2 as being co-located within a single processing unit, in implementations in which processor(s) 20 or 50 includes multiple processing units, one or more instructions may be executed remotely from the other instructions.

Storage devices 40 and 70, may comprise, for example, random access memory (RAM), read only memory (ROM), and/or other memory. Storage device 40 or 70 may store the computer program instructions (such as the aforementioned instructions) to be executed by processor 20 or 50, respectively, as well as data that may be manipulated by processor 20 or 50. Storage device 40 or 70 may comprise one or more non-transitory machine-readable storage media such as floppy disks, hard disks, optical disks, tapes, or other physical storage media for storing computer-executable instructions and/or data.

Other storage may be used as well, depending on the particular storage and retrieval requirements. For example, the various information described herein may be stored using one or more databases. The databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The training nodes 10 and management node 12 illustrated in FIG. 2, respectively, may be coupled to other nodes via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other figures, different numbers of entities than those depicted may be used. Furthermore, according to various implementations, the components described herein may be implemented in hardware and/or software that configure hardware.

Figure 3:
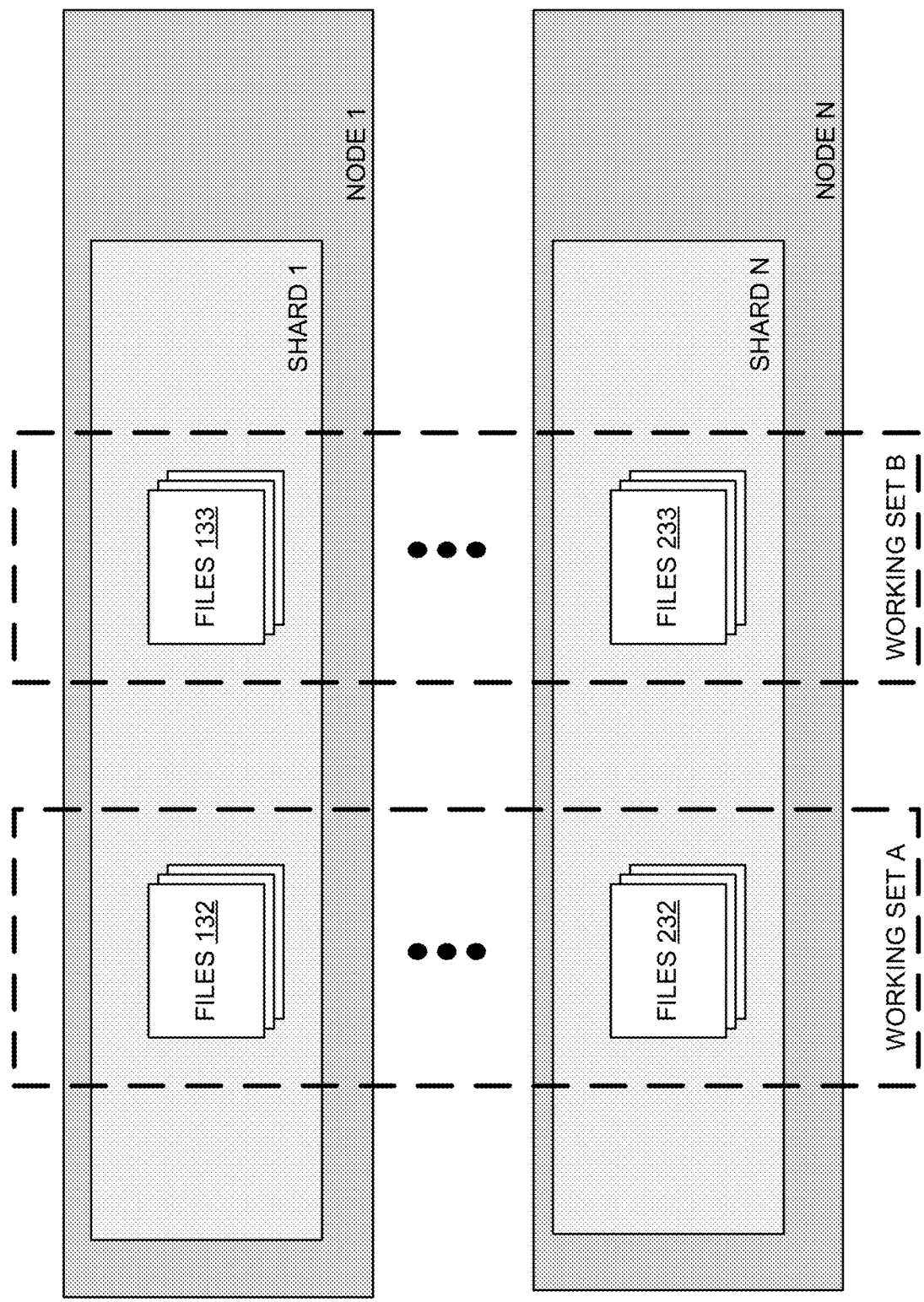
FIG. 3 illustrates an example allocation of a training data set into two working sets in accordance with various embodiments of the disclosed technology.

FIG. 3 is a diagram illustrating an example allocation of a training data set into two working sets in accordance with various embodiments. Referring now to FIG. 3, this example includes N shards distributed across N nodes (e.g., training nodes 10), one shard per node. In this example, each shard has multiple data files 132, 133, 232, 233 and these data files 132, 133, 232, 233 are divided into two working sets, working set A and working set B. Particularly, shard 1 includes a plurality of data files 132 at node 1 that are assigned to working set A and a plurality of data files 133 that are assigned to working set B. Similarly, in this example shard N includes a plurality of data files 232 at node N that are assigned to working set A and a plurality of data files 233 that are assigned to working set B. As seen in this example, both working set A and working set B include files from a plurality of shards at a plurality of nodes. In some embodiments, working set A and working set B include files from all shards at all nodes. In further embodiments, each of the files in the entire data set are assigned to a working set. In some embodiments, some files may remain on assigned. Although there are only two nodes and two shards illustrated in this example, embodiments may be implemented in networks where there are more than two training nodes.

As noted above, and various embodiments the training nodes (e.g., node 1-node N) perform training on a first data set, and when that is complete they shuffle the first data set while performing training on a $2^{nd}$ data set. The neural network training may be done in iterations such that given an input batch X of training examples, the training algorithms (e.g., SGD) computes the neural network outputs Y, compares these outputs with expected outputs $Y_{expected}$, and performs back propagation aggregating gradients across training nodes. This can help to achieve better performance by performing backpropagation and gradient aggregation simultaneously, in parallel. Overlapping these two activities can allow the communication overhead to be effectively hidden.

Figure 4:
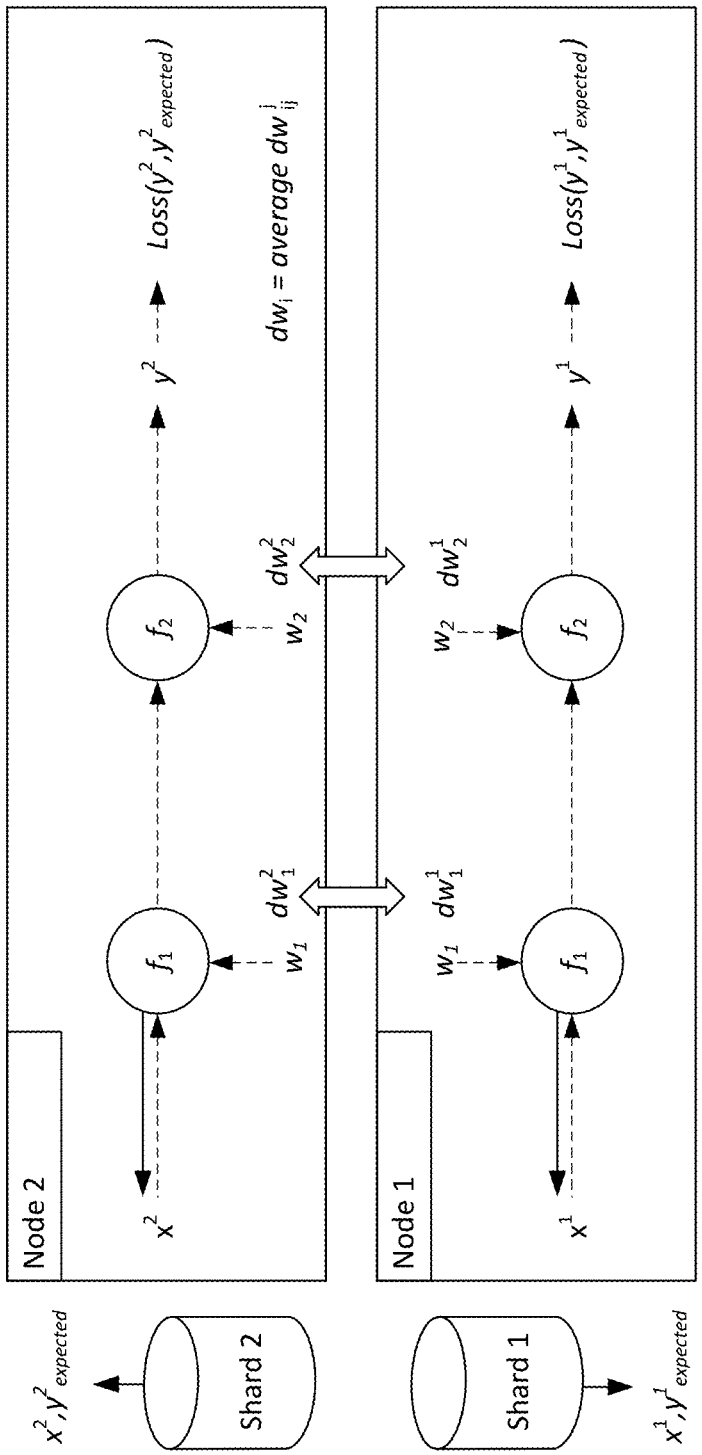
FIG. 4 illustrates an example of overlapping gradient computations and gradient aggregation in accordance with various embodiments of the disclosed technology.
Figure 5:
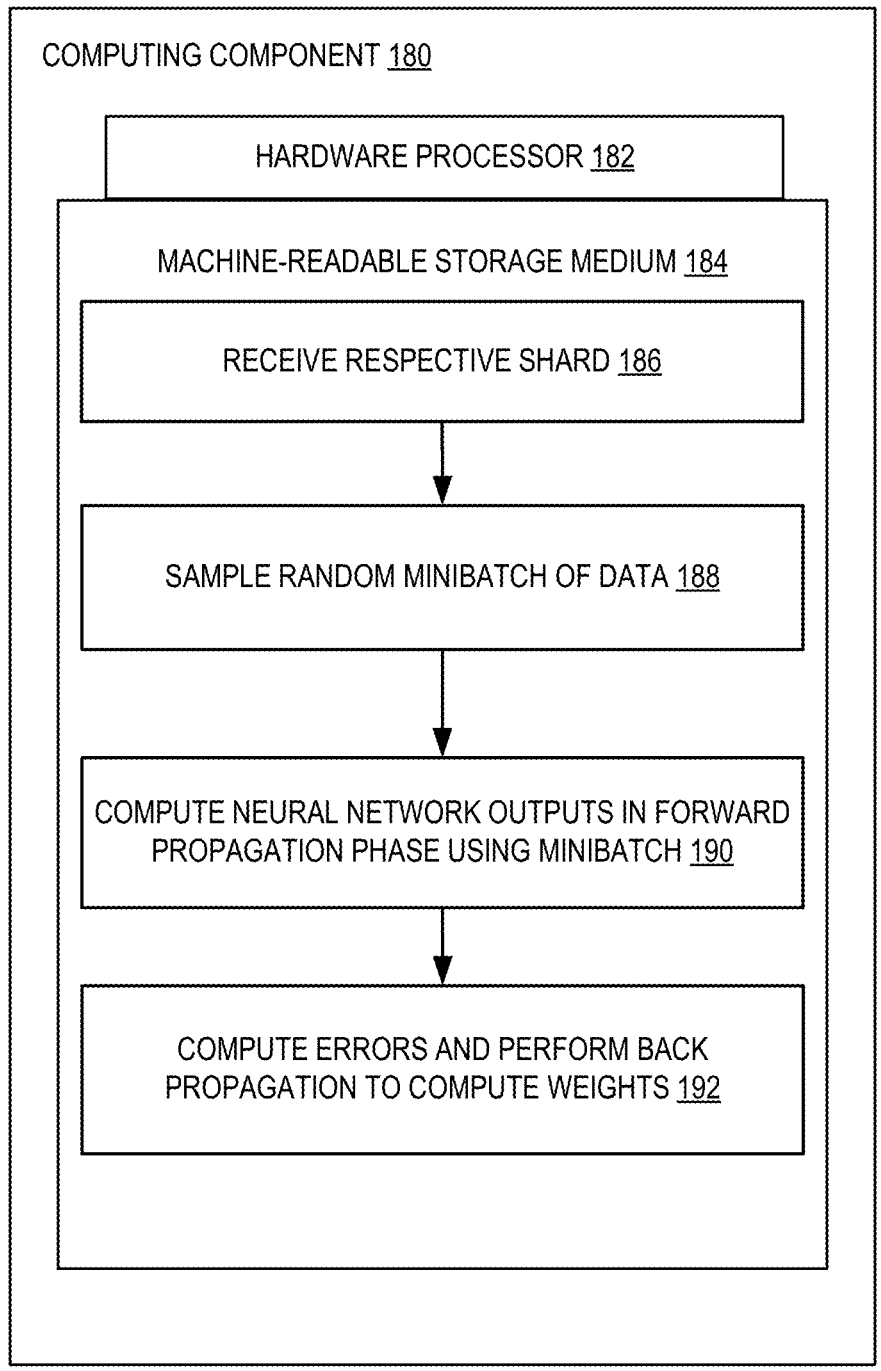
FIG. 5 illustrates an example computing component that may be used to implement overlapping gradient computations and gradient aggregation in accordance with various embodiments of the disclosed technology.

FIG. 4 illustrates an example of overlapping gradient computations and gradient aggregation in accordance with various embodiments. FIG. 5 illustrates an example computing component that may be used to implement overlapping gradient computations and gradient aggregation in accordance with various embodiments. Computing component 180 may be, for example, a server computer, a controller, or any other similar computing component capable of processing data. In the example implementation of FIG. 5, the computing component 180 includes a hardware processor 182, and machine-readable storage medium 184. In some embodiments, computing component 180 may be an embodiment of processor 50 of training node 10 (FIG. 2).

Hardware processor 182 may be one or more central processing units (CPUs), semiconductor-based microprocessors, and/or other hardware devices suitable for retrieval and execution of instructions stored in machine-readable storage medium 184. Hardware processor 182 may fetch, decode, and execute instructions, such as instructions 186-192, to control processes or operations for merging local parameters to effectuate swarm learning in a blockchain context using homomorphic encryption. As an alternative or in addition to retrieving and executing instructions, hardware processor 182 may include one or more electronic circuits that include electronic components for performing the functionality of one or more instructions, such as a field programmable gate array (FPGA), application specific integrated circuit (ASIC), or other electronic circuits.

Fast distributed training may be achieved in various implementations by overlapping backward computations and communication acts that aggregate the vectors of gradients across the distributed training nodes. FIGS. 4 and 5 illustrate the example using two nodes (node 1 and node 2) and two shards, although greater quantities of nodes and shards may be implemented.

A machine-readable storage medium, such as machine-readable storage medium 184, may be any electronic, magnetic, optical, or other physical storage device that contains or stores executable instructions. Thus, machine-readable storage medium 184 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 184 may be a non-transitory storage medium, where the term "non-transitory" does not encompass transitory propagating signals. As described in detail below, machine-readable storage medium 184 may be encoded with executable instructions, for example, instructions 186-192.

Referring now to FIGS. 4 and 5, in this example, node 1 and node 2 train the neural network synchronously. The neural network may be implemented as a 2-layer neural network represented with layers f1 and f2, as seen in the illustrated example.

Hardware processor 182 may execute instruction 186 to receive a shard for the node. As in the example illustrated above in FIG. 3, each node (node 1 and node 2) in this example receives its own respective shard (shard 1 and shard 2, respectively). Hardware processor 182 for each node may execute instruction 188 to cause each node to sample a random minibatch of data of size M. This random minibatch of data can be, for example, a random subsample of files from their respective shards. In terms of the example illustrated in FIG. 3, the random minibatch can be a random sampling of files from files 132, 133, 232 and 233.

Hardware processor 182 for each node may execute instruction 190 to cause the node to compute neural network outputs y1 and y2 in the forward propagation phase using the sampled random minibatch of data. Hardware processor 182 for each node may execute instruction 192 to compute errors and perform back propagation to compute weight updates $dw_i$. The error computed is designated as "Loss" in FIG. 4 and may be computed as a difference between the actual output and the expected output.

For example, consider a point in time when two nodes compute gradients for layer f2 ($dw_1^2$ and $dw_2^2$). Once this is done, in the compute graph several operations can be executed in parallel. Neural networks can continue computing gradients for other layers (f1) and in the same time epoch they can start aggregating gradients with respect to layers f2 across nodes. If computations and communications are perfectly overlapped, the latter does not introduce any overhead and training scales linearly as the quantity of nodes increases. However, as described below the nodes may need to exchange vectors many times per second, and the vector size can be large (e.g. on the order of tens of megabytes to hundreds of megabytes). This large amount of data transfer can be a downside of scaling to multiple nodes. Accordingly, embodiments may be implemented to control the amount of exchange so as not to interfere with the training process. Examples of this are described below.

Figure 6:
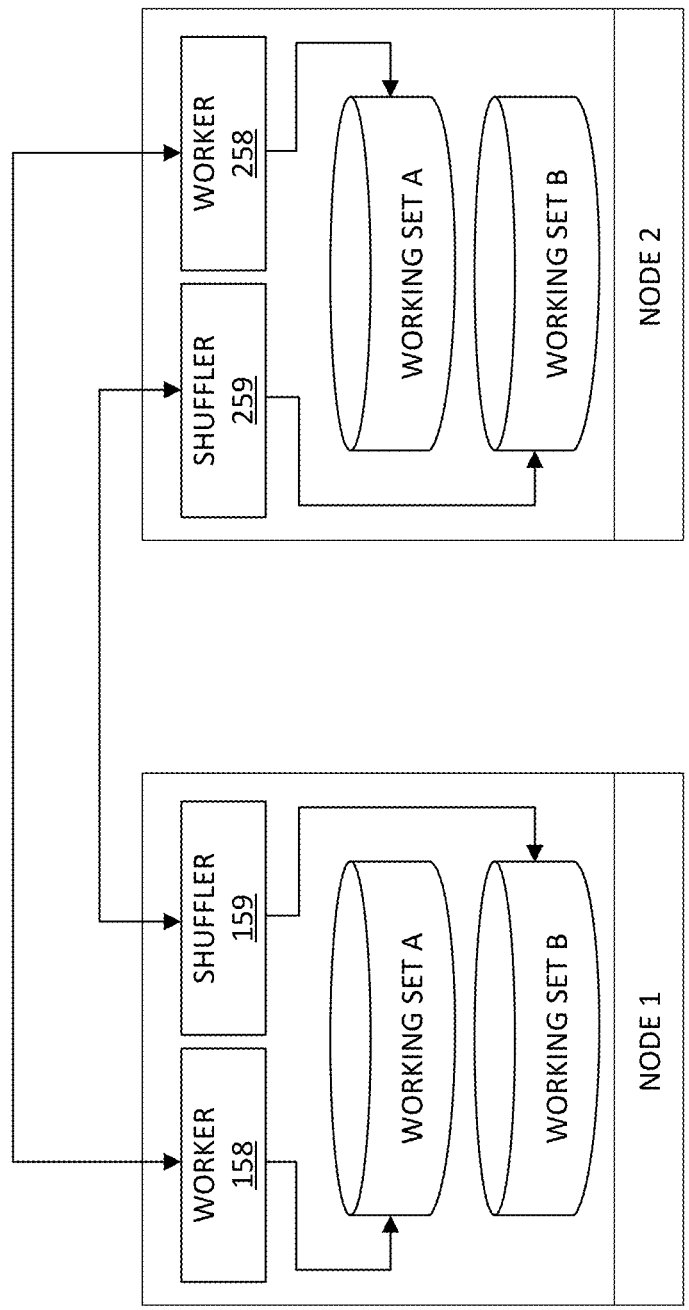
FIG. 6 illustrates an example of overlapping in accordance with one various embodiments of the disclosed technology.
Figure 7:
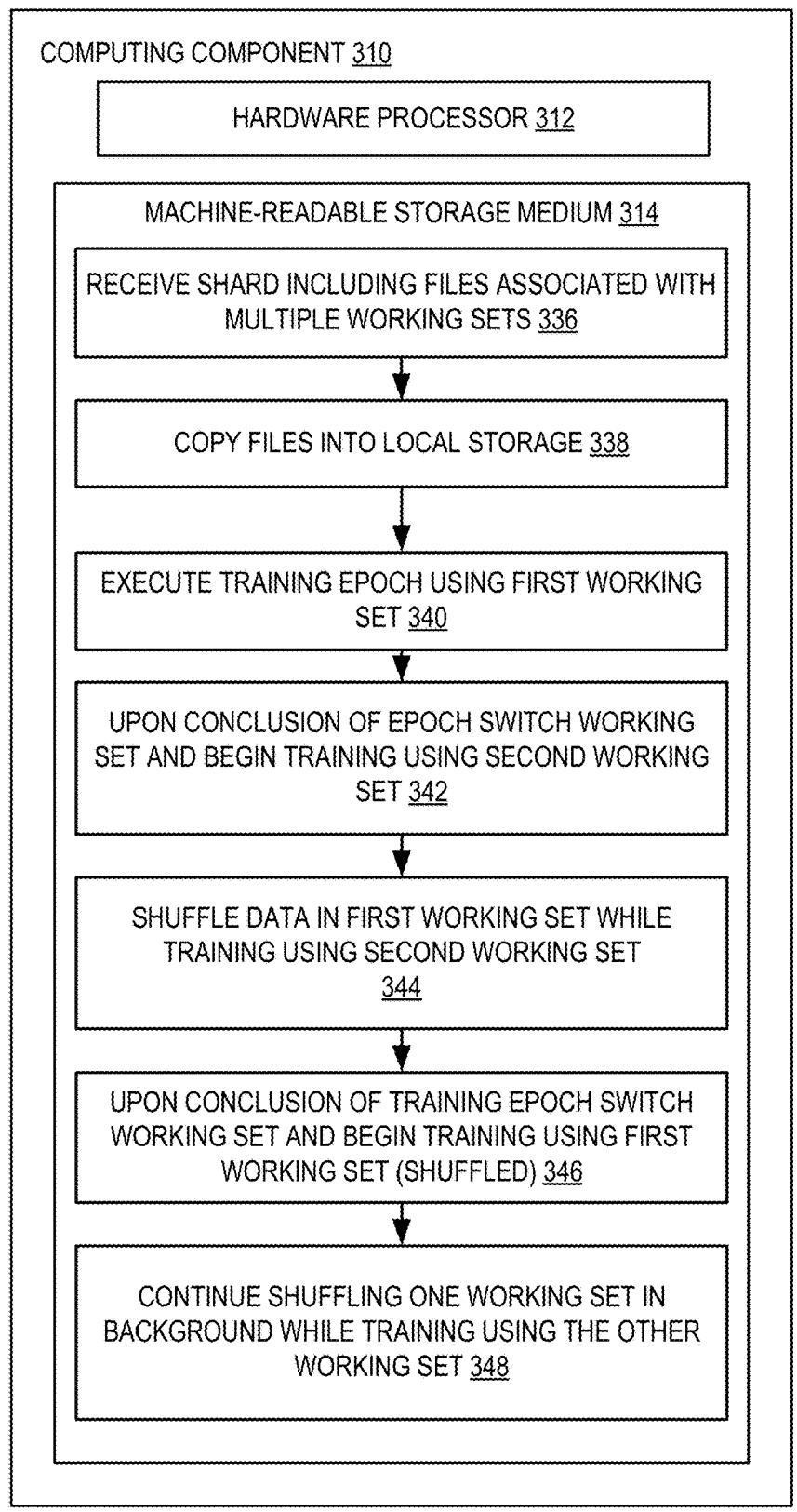
FIG. 7 illustrates an example computing component that may be used to implement overlapping in accordance with various embodiments of the disclosed technology.

FIG. 6 illustrates an example of overlapping in accordance with one various embodiments. FIG. 7 illustrates an example computing component that may be used to implement overlapping in accordance with various embodiments. The example illustrated in FIG. 6 again uses an example implementation having to nodes, node 1 and node 2, and two working sets, working sent A and working set B. The example in FIG. 6 also illustrates that each node (node 1 and node 2) includes its respective worker 158, 258 to perform the training and its respective shuffler 159, 259 to perform the shuffling.

Computing component 310 may be, for example, a server computer, a controller, or any other similar computing component capable of processing data. In the example implementation of FIG. 7, the computing component 310 includes a hardware processor 312, and machine-readable storage medium 184. In some embodiments, computing component 310 may be an embodiment of processor 50 of training node 10 (FIG. 2).

Hardware processor 312 may be one or more central processing units (CPUs), semiconductor-based microprocessors, and/or other hardware devices suitable for retrieval and execution of instructions stored in machine-readable storage medium 314. Hardware processor 312 may fetch, decode, and execute instructions, such as instructions 336-348. As an alternative or in addition to retrieving and executing instructions, hardware processor 312 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 314, may be any electronic, magnetic, optical, or other physical storage device that contains or stores executable instructions. Thus, machine-readable storage medium 314 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 314 may be a non-transitory storage medium, where the term "non-transitory" does not encompass transitory propagating signals. As described in detail below, machine-readable storage medium 314 may be encoded with executable instructions, for example, instructions 336-348.

Referring now to FIGS. 6 and 7, Hardware processor 312 for each node may execute instruction 336 to cause the node to receive its respective shard, including the files of that shard. As described herein, the files of each shard may be assigned to their respective working sets. Accordingly, the training data set can be split into N shards for a network having N training nodes. Each shard may be assigned instances from the original data set, and this assignment can be made randomly. Each instance may be assigned to a single shard. As also described herein, data files of each shard can be assigned to working sets. In the example illustrated in FIG. 6, there are 2 working sets, working set A and working set B.

Hardware processor 312 for each node may execute instruction 338 to cause the received data files to be stored into its local storage. Each data file may be flagged or otherwise identified to indicate the working set (A or B) to which it belongs. This can be used to facilitate retrieval of the appropriate working set at runtime.

Hardware processor 312 for each node may execute instruction 340 to cause the node to perform training of the neural network using the first working set (e.g., working set A). For example, nodes one and node 2 retrieve the data files belonging to working set A from their respective local storage and a worker module 158 (e.g., processor 50 executing instructions 78) begins performing the training. During the training epoch, the nodes perform the training using the data from the first working set. As described above, in some embodiments the training can be performed using stochastic gradient descent.

Upon conclusion of the first training epoch, hardware processor 312, for each node, may execute instruction 342 to cause the node to switch the working set and begin training using the second working set (e.g., working set B). This can be accomplished, for example, by using a different file path in the local file system. During the training epoch, the nodes perform the training using the data from the second working set. As described above, in some embodiments the training can be performed using stochastic gradient descent. At the same time as training is switched to the second working sent, the workers 158, 258 can send a message to their respective shufflers 159, 259 that the working set has changed.

Hardware processor 312 for each node may execute instruction 344 to cause the node to shuffle data in the first working set (e.g., working set A) while training the neural network using data from the second working set (e.g., working set B). Accordingly, shufflers 159, 259, running in the background, randomly shuffle data from the first working set. The shuffling may continue until either determined shuffling criteria are met (e.g., an amount of data shuffling) or the shufflers 159, 259 receive notice from their respective workers 158, 258 that the workers 158, 258 finished their training epochs. Workers 158, 258 may instruct their respective shufflers 159, 259 to stop shuffling when the workers 158, 258 have finished their epochs.

Hardware processor 312 for each node may execute instruction 346 to cause the node to again switch working sets and begin training using the just-shuffled other working set. For example, upon conclusion of the training epoch and shuffling conducted at 342 and 344, instruction 346 may cause the nodes to switch the working set to begin training using the first working set which was recently shuffled at 344. At the same time, instruction 346 may cause the nodes to now shuffle the second working set (for which training was just completed.

Hardware processor 312 for each node may execute instruction 348 to cause the node to continue this process iteratively, shuffling one working set in the background while training using the other working set in the foreground. In this manner, gradient computations and gradient aggregation can be performed in an overlapping manner.

Because data shuffling consumes some of the available network bandwidth, shuffling an overlapping manner may negatively impact the training process. Because nodes may need to synchronize the gradients multiple times per second, and the size of the vectors may be tens of millions of floating-point numbers, sufficient network resources must remain available for gradient synchronization traffic. Accordingly, embodiments may be implemented to reduce or eliminate interference between gradients synchronization traffic and data shuffling traffic on the same network so as to not slow down the overall training process.

Accordingly, embodiments may be configured to ensure that the shuffler (e.g. shuffler 159, 259) is aware of the stage. For example, in some implementations the nodes are configured to allow the shuffler to be aware of the stage at which the node is operating. Shuffling may be implemented such that shuffling occurs only in the forward propagation phase, and there will be little or no shuffling in the back propagation phase to allow the nodes to focus on training. Some embodiments may further refine this to look at the amount of gradient exchanges is occurring in the backward pass and to use this information to determine whether and how much shuffling to perform in the backward pass. For example, some implementations may want to aggregate data and collect enough training data before they start reducing the data. Accordingly, there may be periods where there is little communication of gradients during the backward pass. The system may be configured to be aware of the level of gradient communication and use this when determining whether and how much to allow shuffling during the backward pass. Other embodiments may look at performance and use a control system to ensure that the data shuffling activities do not impact the role training performance.

Figure 8:
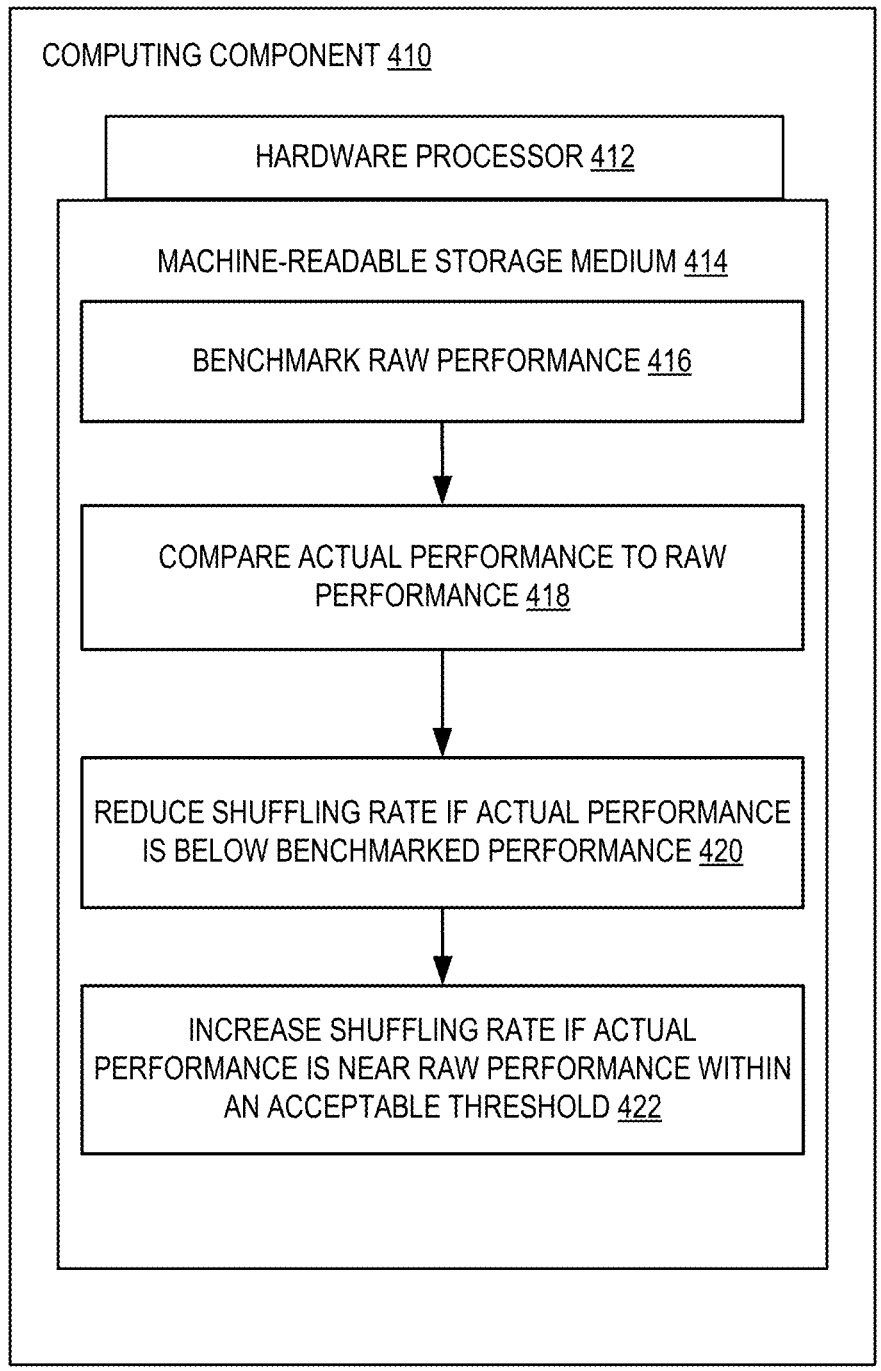
FIG. 8 illustrates an example computing component that may be used to implement intelligent shuffling control in accordance with various embodiments of the disclosed technology.

FIG. 8 illustrates an example computing component that may be used to implement intelligent shuffling control in accordance with various embodiments. Particularly, FIG. 8 illustrates an example computing component that may implement a feedback loop to collect information on training performance and to use this feedback to determine whether the overlapping shuffling is impacting the training.

Computing component 410 may be, for example, a server computer, a controller, or any other similar computing component capable of processing data. In the example implementation of FIG. 8, the computing component 410 includes a hardware processor 412, and machine-readable storage medium 414. In some embodiments, computing component 410 may be an embodiment of processor 50 of training node 10 or processor 20 on management node 12 (FIG. 2).

Hardware processor 412 may be one or more central processing units (CPUs), semiconductor-based microprocessors, and/or other hardware devices suitable for retrieval and execution of instructions stored in machine-readable storage medium 414. Hardware processor 412 may fetch, decode, and execute instructions, such as instructions 416-422, to control processes or operations for intelligent data shuffling. As an alternative or in addition to retrieving and executing instructions, hardware processor 412 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 414, may be any electronic, magnetic, optical, or other physical storage device that contains or stores executable instructions. Thus, machine-readable storage medium 414 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 414 may be a non-transitory storage medium, where the term "non-transitory" does not encompass transitory propagating signals. As described in detail below, machine-readable storage medium 414 may be encoded with executable instructions, for example, instructions 416-422.

Hardware processor 412 may execute instruction 416 to cause the system to benchmark the raw training performance for the training network. For example, raw performance can be measured in terms of the number of data instances per second the distributed network can perform the training. For example, for convolutional neural networks solving an image classification task, the system might be classified in terms of images per second. This allows the system to establish a baseline performance for the distributed network. In some embodiments, measurements of network performance to perform the benchmarking can be performed during the first training epoch (e.g., at 340 in FIG. 7) when there is no background shuffling happening. In this case, the raw performance can be measured without interference from shuffling operations.

In other embodiments, the raw performance can be benchmarked using performance models to estimate the time required to perform the various training steps such as, for example, forward and backward passes and gradient aggregation. In still other embodiments, statistical, machine learning/deep learning models can be used to better estimate performance. In yet other embodiments, a database of historical performance results can be used to provide the data to establish the baseline benchmark.

Hardware processor 412 may execute instruction 418 to cause the system to compare actual performance to the benchmarked raw performance. To execute this operation, the system may evaluate in real time current training performance of the system. Again, this can be measured using, for example, the number of data instances the distributed network is able to train in operation when shuffling is occurring or permitted to occur. As a result of this comparison, the system can determine whether the system is performing at the expected performance levels or below.

Embodiments may be implemented such that, beginning from the second training epoch (i.e., when shuffling of the first data set may occur in the background) the system can start shuffling in the background while continuously monitoring raw performance. As noted, this measured performance can be compared to the benchmarked performance to determine whether the system is performing as expected.

If the measured actual performance is below the benchmarked performance hardware processor 412 may execute instruction 420 to cause the nodes to reduce the shuffling speed to reduce the amount of network bandwidth required to perform the shuffling. If the impact is severe, the system may even halt the shuffling operation. This allows more bandwidth to be made available for training. On the other hand, if the measured actual performance is near (e.g., within an acceptable determined margin or threshold), the benchmarked performance, hardware processor 412 may execute instruction 422 to cause the nodes to increase the shuffling speed, which would be expected to consume additional network bandwidth.

In the examples described above, shuffling is performed within the respective working sets. That is data within working set A is shuffled with other data in working set A, and data in working set B is shuffled with other data in working set B. In other examples, the nodes can be configured to exchange data within each node such that data files originally assigned to working set A may at some point be reallocated to working set B and vice versa. Using this approach, if the training continues for enough time, it is possible that every node will get to see the entire data set. In terms of the example illustrated a FIG. 3, a hybrid approach can be implemented in which data is shuffled not only 'vertically' within each working set and across nodes, but also 'horizontally' within each node and across working sets. The training process may further include an internal buffer of training examples that can be used to store files for such additional shuffling. For example, when working on a given data set the nodes may read the data files in that data set and then buffer those data files for later shuffling.

Figure 9:
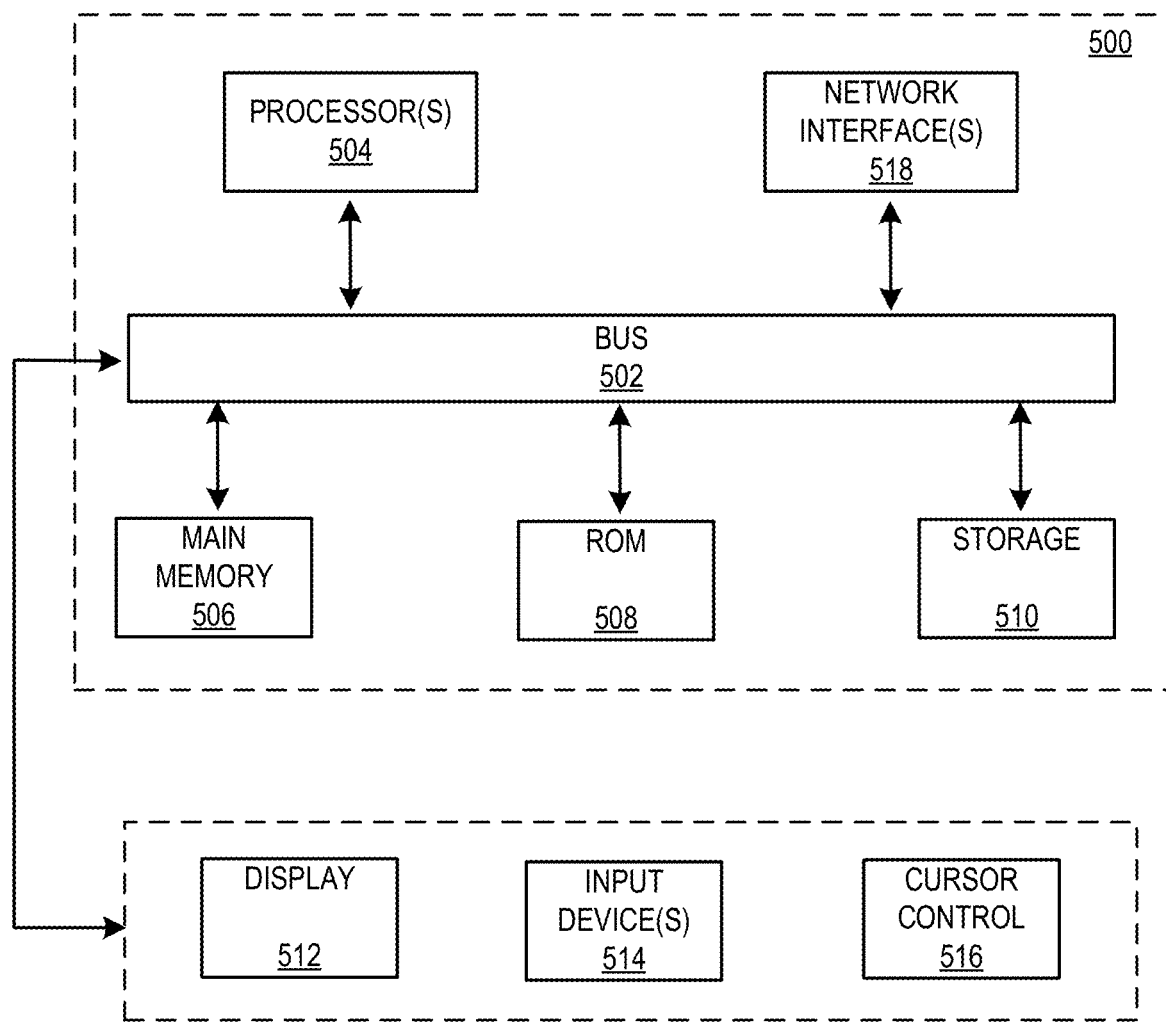
FIG. 9 is an example computing component that may be used to implement various features of embodiments of the present disclosure.

FIG. 9 depicts a block diagram of an example computer system 500 in which various embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing"

environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit or component might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits or components described herein might be implemented as discrete circuits/components or the functions and features described can be shared in part or in total among one or more circuits/components. Even though various features or elements of functionality may be individually described or claimed as separate circuits/components, these features and functionality can be shared among one or more common circuits/components, and such description shall not require or imply that separate circuits/components are required to implement such features or functionality. Where a circuit/component is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method of data shuffling for distributed machine learning training using a training data set, the method comprising:

each of N training nodes in a distributed network receiving one of N shards of training data, wherein the training data set is divided into a plurality of N shards comprising a plurality of data items and each of the plurality of data items is assigned to one of a first working set and a second working set such that each of the first and second working sets includes data items from a plurality of shards, and the first and second working sets are defined to allow each of the N training nodes to access each of the plurality of shards from the first and second working sets;

the training nodes each performing training using the data items of the first working set that are in each node's respective shard;

upon completion of the training using the data items of the first working set, the training nodes performing training using the data items of the second working set that are in each node's respective shard;

monitoring performance of the training using the data items of the second working set;

while the training nodes are performing training on their respective subsets of shards of the second working set, simultaneously performing random shuffling of the data items in the first working set to create a shuffled first working set; and adjusting, according to the monitoring of the simultaneous training using the data items of the second working set, a speed of the shuffling of the data items in the first working set.

2. The method of claim 1, wherein simultaneously performing random shuffling of the data items in the first working set or the second working set comprises shuffling data items within their respective working sets across a plurality of the N training nodes.

3. The method of claim 1, further comprising: upon completion of training using the data items of the second working set, the training nodes performing training using the shuffled first working set; and while the training nodes are performing training on the shuffled first working set, simultaneously performing random shuffling on the data items in the second working set to create a shuffled second working set.

4. The method of claim 1, wherein each shard receives random instances of training data items from the training data set.

5. The method of claim 1, wherein the adjusting the speed of the shuffling comprises adjusting an amount of bandwidth used for data shuffling across nodes based on performance.

6. The method of claim 5, wherein the adjusting the amount of bandwidth used for data shuffling across nodes based on performance comprises reducing the amount of bandwidth allocated for shuffling to reduce shuffling speed upon detection of training performance degradation exceeding a degradation threshold.

7. The method of claim 1, wherein the adjusting the speed of the shuffling comprises comparing the monitored performance of the training to a benchmarked training performance and adjusting the amount of data shuffling across nodes based on the comparison.

8. The method of claim 7, wherein benchmark training performance is obtained by measuring training performance of the distributed network during a first training epoch when the training nodes are training using the first working set, but are not yet shuffling the second working set.

9. The method of claim 1, further comprising enabling data shuffling with no rate throttling during a forward propagation phase of the training.

10. The method of claim 1, further comprising adjusting a speed of data shuffling across nodes based on performance models for the network.

11. A training node for performing data shuffling for distributed machine learning training using a training data set, the training node comprising:
- a processor; and
- a memory unit operatively connected to the processor, the memory unit including instructions that when executed by the processor, cause the training node to perform the operations of:
  - receiving one of N shards of training data, wherein the training data set is divided into a plurality of N shards comprising a plurality of data items, each of the respective N shards is sent to its respective training node in a distributed training network, and each of the plurality of data items is assigned to one of a first working set and a second working set such that each of the first and second working sets includes data items from a plurality of shards, and the first and second working sets are defined to allow each of the N training nodes to access each of the plurality of shards from the first and second working sets;
  - performing training using the data items of the first working set that are in the shard received by the training node;
  - upon completion of the training using the data items of the first working set, the training node performing training using the data items of the second working set that are in the training node's shard;
  - monitoring performance of the training using the data items of the second working set;
  - while the training node is performing training on its subset of shards of the second working set, simultaneously performing random shuffling of the data items in the first working set across other nodes in the distributed training network to create a shuffled first working set; and
  - adjusting, according to the monitored performance of the training using the data items of the second working set, a speed of the shuffling of the data items in the first working set.

12. The node of claim 11, wherein simultaneously performing random shuffling of the data items in the first working set or the second working set comprises shuffling data items within their respective working sets across a plurality of the N training nodes.

13. The node of claim 11, further comprising: upon completion of training using the data items of the second working set, the training node performing training using the shuffled first working set; and while the training node is performing training on the shuffled first working set, the training node simultaneously performing random shuffling of the data items in the second working set with other nodes in the distributed training network to create a shuffled second working set.

14. The node of claim 11, wherein each shard receives random instances of training data items from the training data set.

15. A distributed training network for performing data shuffling for distributed machine learning training using a training data set, the distributed training network comprising:
- a plurality of training nodes, each training node of the plurality of training nodes comprising a processor and a memory unit operatively connected to the processor, the memory units of the plurality of nodes including instructions that when executed, cause the training nodes to perform the operations of:
  - each of N training nodes of the plurality of training nodes receiving one of N shards of training data, wherein the training data set is divided into a plurality of N shards comprising a plurality of data items and each of the plurality of data items is assigned to one of a first working set and a second working set such that each of the first and second working sets includes data items from a plurality of shards, and the first and second working sets are defined to allow each of the N training nodes to access each of the plurality of shards from the first and second working sets;
  - performing training using the data items of the first working set that are in each node's respective shard;
  - upon completion of the training using the data items of the first working set, performing training using the data items of the second working set that are in each node's respective shard; and
  - while the training nodes are performing training on their respective subsets of shards of the second working set, simultaneously performing random shuffling of the data items in the first working set to create a shuffled first working set; and
- a management node comprising a second processor and a second memory unit operatively connected to the second processor, the second memory unit including instructions that when executed, cause the management node to perform the operations of:
  - monitoring performance of the training using the data items of the second working set; and
  - adjusting, according to the monitored performance of the training using the data items of the second working set, a speed of the shuffling across nodes of the data items in the first working set.

16. The distributed training network of claim 15, wherein simultaneously performing random shuffling of the data items in the first working set or the second working set comprises shuffling data items within their respective working sets across a plurality of the N training nodes.

17. The distributed training network of claim 15, wherein the operations further comprise upon completion of training using the data items of the second working set, the training nodes performing training using the shuffled first working set; and
- while the training nodes are performing training on the shuffled first working set, simultaneously performing random shuffling of the data items in the second working set to create a shuffled second working set.

18. The distributed training network of claim 15, wherein each shard receives random instances of training data items from the training data set.

19. The distributed training network of claim 15, wherein the adjusting the speed of the shuffling across nodes comprises adjusting an amount of bandwidth used for data shuffling across nodes based on performance.

20. The distributed training network of claim 19, wherein the adjusting the amount of bandwidth used for data shuffling across nodes based on performance comprises reducing the amount of bandwidth allocated for shuffling to reduce shuffling speed upon detection of training performance degradation exceeding a degradation threshold.

21. The distributed training network of claim 15, wherein the adjusting the speed of the shuffling across nodes comprises comparing the monitored performance of the training to a benchmarked training performance and adjusting the amount of data shuffling across nodes based on the comparison.

22. The distributed training network of claim 21, wherein benchmark training performance is obtained by measuring training performance of the distributed network during a first training epoch when the training nodes are training using the first working set, but are not yet shuffling the second working set.

23. The distributed training network of claim 15, wherein the operations further comprise enabling data shuffling with no rate throttling during a forward propagation phase of the training.

24. The distributed training network of claim 15, wherein the operations further comprise adjusting a speed of data shuffling across nodes based on performance models for the network.

* * * * *